United States Patent
Arold et al.

(10) Patent No.: US 10,696,154 B2
(45) Date of Patent: Jun. 30, 2020

(54) COOPERATING TANK AND RACK SUPERSTRUCTURE

(71) Applicant: Quantum Fuel Systems LLC, Lake Forest, CA (US)

(72) Inventors: Mark Arold, Torrance, CA (US);
Joseph Hudak, Long Beach, CA (US);
Christopher Jaeger, Kirkland, WA (US); Tae Kim, Orange, CA (US);
Derrin Olischefski, Trabuco Canyon, CA (US)

(73) Assignee: Quantum Fuel Systems LLC, Lake Forest, CA (US)

(*) Notice: Subject to any disclaimer, the term of this patent is extended or adjusted under 35 U.S.C. 154(b) by 381 days.

(21) Appl. No.: 15/349,786

(22) Filed: Nov. 11, 2016

(65) Prior Publication Data

US 2017/0057348 A1 Mar. 2, 2017

Related U.S. Application Data (63) Continuation of application No. PCT/US2015/030904, filed on May 14, 2015.
(Continued)

(51) Int. Cl.
*B60K 15/07* (2006.01)
*B60K 15/067* (2006.01)
(Continued)

(52) U.S. Cl.
CPC .......... *B60K 15/067* (2013.01); *B60K 15/07* (2013.01); *F17C 13/083* (2013.01); *F17C 13/084* (2013.01); *B60K 2015/03032* (2013.01); *B60K 2015/03151* (2013.01); *B60K 2015/03453* (2013.01); *B60Y 2304/03* (2013.01); *F17C 2201/0104* (2013.01); *F17C 2201/035* (2013.01); *F17C 2201/056* (2013.01); *F17C 2205/013* (2013.01);
(Continued)

(58) Field of Classification Search
CPC .......... B60K 15/07; B60K 2015/0675; B60K 2015/0638
See application file for complete search history.

(56) References Cited

U.S. PATENT DOCUMENTS

| 5,810,309 A | 9/1998 | Augustine et al. |
| 8,366,152 B2* | 2/2013 | Tsubokawa .......... B60K 15/07 280/784 |
| 8,534,403 B2* | 9/2013 | Pursifull ............ B60K 15/07 180/314 |
| 2003/0175457 A1 | 9/2003 | Jousse et al. |

(Continued)

FOREIGN PATENT DOCUMENTS

| CN | 202413403 U | 9/2012 |
| DE | 102012004319 A1 | 9/2013 |

(Continued)

OTHER PUBLICATIONS

European Patent Application No. 15792934.0; Extended Search Report; dated Dec. 8, 2017; 11 pages.
(Continued)

*Primary Examiner* — Andrew T Kirsch
(74) *Attorney, Agent, or Firm* — Baker Hostetler (57) ABSTRACT

A cooperating rack structure comprising at least two modules affixed to legs and a method of reduced weight vertical storage of fuel tanks for use in motor vehicles wherein the fuel tanks form a cooperating portion of the rack superstructure.

5 Claims, 9 Drawing Sheets

Related U.S. Application Data (60) Provisional application No. 61/993,981, filed on May 15, 2014.

(51) Int. Cl.
*F17C 13/08* (2006.01)
*B60K 15/03* (2006.01)

(52) U.S. Cl.
CPC .............. *F17C 2205/0107* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/036* (2013.01); *F17C 2260/012* (2013.01); *F17C 2270/0171* (2013.01); *Y02E 60/321* (2013.01)

(56) References Cited

U.S. PATENT DOCUMENTS

| | | | |
|---|---|---|---|
| 2006/0032532 A1* | 2/2006 | Suess | B60K 15/03006 137/266 |
| 2009/0090726 A1 | 4/2009 | Kawamata | |
| 2012/0183370 A1 | 7/2012 | Mulanon | |

FOREIGN PATENT DOCUMENTS

| | | |
|---|---|---|
| EP | 1262710 A2 | 12/2002 |
| JP | 2005-035388 A | 2/2005 |

OTHER PUBLICATIONS

International Patent Application No. PCT/US2015/030904; Int'l Search Report and the Written Opinion; dated Aug. 21, 2015; 11 pages.

\* cited by examiner

COOPERATING TANK AND RACK SUPERSTRUCTURE

CROSS REFERENCE TO RELATED APPLICATIONS

This application is a Continuation of International Patent Application No. PCT/US2015/030904, filed May 14, 2015, which claims priority to U.S. Provisional Patent Application 61/993,981, filed May 15, 2014, the contents of which are incorporated herein by reference in their entirety.

BACKGROUND

This disclosure relates to a load bearing compressed gas tank mounting structure for motor vehicles.

Pressurized cylinder failure is measured in terms of burst pressure. If a cylinder has a 3000 psi rating it will have a burst strength (or failure rating) of 2-3 times that normal 3000 psi rating.

Pressurized cylinders are useful; for storing and transporting fuels such as hydrogen, natural gas (CNG) and propane.

Storage of gaseous fuel cylinders/tanks in a tractor or trailer must meet crash safety requirements.

Tractor Trailers have many different weight ratings which may affect their usage and the cost of usage.

Gross Vehicle Weight (GVW). This is the total weight of the loaded vehicle. This includes the vehicle itself and the cargo that is loaded on the vehicle.

Gross Combination Weight (GCW). This is specified by the manufacturer as the maximum loaded weight of a truck/tractor plus the trailer or semi-trailer designed for use with the truck/tractor.

Gross Vehicle Weight Rating (GVWR). This is the rating that is calculated by the manufacturer as the amount of weight that the vehicle will be when the vehicle itself is weighed, filled with fuel, and loaded according to the manufacturer's specification.

Gross Combination Weight Rating (GCWR). This is the maximum allowable combined mass of a towing road vehicle, passengers and cargo in the tow vehicle, plus the mass of the trailer and cargo in the trailer. This rating is set by the manufacturer.

Safety Compliance Weight. The Federal Motor Carrier Safety Regulations (FMCSRs) have two definitions of a Commercial Motor Vehicle (CMV) for interstate carriers; each definition applies to specific safety regulations. Sec. 390.5 defines the weight of a CMV as 10,001 lbs. or more GVW/GCW or GVWR/GCWR. In this situation, the FMCSA may use either the GVW or the GVWR (whichever is highest). If the actual GVW of the vehicle is 9,150 lbs. but it has a manufacturers' GVWR of 10,500 lbs., it is a CMV subject to the rules. The definition in Parts 382 and 383 says a CMV is 26,001 or more lbs. GCWR or GVWR. In this case, only the manufacturers' weight rating matters. The actual gross vehicle weight is not a factor in determining compliance. When a state adopts the FMCSRs for their intrastate carriers, a different weight threshold may be adopted for intrastate compliance.

Registration Weight. The registered weight of a vehicle is not related to any compliance with the FMCSRs. A vehicle must be registered for the actual gross weight or combined gross weight. This means the empty weight of the vehicle plus the empty weight of any towed vehicle, plus the weight of the heaviest load to be carried. Generally, vehicles should not be registered for a weight higher than the weight rating; most states will not allow registration exceeding the weight rating. If the vehicle travels on the highways at a weight higher than the registered weight shown on the registration, a citation may be issued for overweight on vehicle registration.

Any vehicle operating interstate with a GVW or GCW or registered weight of 26,000 lbs. or more, or having three axles at any weight, is subject to the International Registration Plan (IRP) for apportioned registration and the International Fuel Tax Agreement (IFTA) for payment of fuel use taxes. These base state agreements do not use the vehicle weight rating when determining compliance.

Highway Weight. This is the legal weight related to highway size and weight limits. When operating on the interstate system, the maximum permissible weight is 20,000 lbs. on a single axle, 34,000 lbs. on a tandem axle, and 80,000 lbs. max gross weight. The "Bridge Formula" allows motor vehicles to be loaded to the maximum weight only if each group of axles on the vehicle and their spacing also satisfy the requirements of the formula. States must use these limits for their designated or national network highways. While the majority of the states use the federal bridge formula for all roads in their state, some do have a separate state formula for other state or county roads. Tare weight is measured and a truck can be penalized for higher Tare weights.

National Fire Protection Agency "NFPA" 52: VEHICULAR GASEOUS FUEL SYSTEMS CODE "safeguards people and installations with requirements that mitigate the fire and explosion hazards associated with compressed natural gas (CNG) and liquefied natural gas (LNG) engine fuel systems and fueling facilities."

Section 6.3.4 of the code specifies that each fuel supply container rack shall be secured to the vehicle body, bed, or frame to prevent damage from road hazards, slippage, loosening, or rotation using a method capable of withstanding a static force in the six principal of eight times the weight of a fully pressurized container(s).

Moreover section 6.3.5 specifies that each fuel supply container in the rack shall be secured to its cradle in a manner that it is capable of withstanding a static force, applied in the six principal directions of eight times the weight of the fully pressurized container with a maximum displacement of 0.50 in. (13 mm).

A traditional rack and tank support system provides a steel rack/cage with compartments to hold tanks to meet such safety standards and bear loads.

DISCLOSURE

Briefly, gaseous fuel stored in cylinders on a tractor and/or trailer add weight. Weight affects cost to operate and regulatory issues.

Cylindrical pressurized filament wrapped composite cylinders are a light weight alternative to metal tanks for storing gaseous fuels. Such cylinder can withstand hoop stress and axially stress applied externally of at least a quantity equal to the burst rating.

Traditionally vertical rack for mounting gaseous fuel cylinder are heavy steel or metal racks with trusses supporting the levels. Disclosed herein are aspects of exemplary implementations of a novel tank and rack method and system that obviate the shortfalls of traditional system with a cooperating structure for supporting cylindrical tanks in a vertical configuration with a decrease in at least one of rack footprint, size, mass, complexity and weight.

Traditionally vertical rack for mounting gaseous fuel cylinder, to meet safety regulations, are heavy steel or metal racks with trusses supporting the levels. Disclosed herein are aspects of exemplary implementations of a novel tank and rack method and system that obviate the shortfalls of traditional system with a cooperating structure for supporting cylindrical tanks in a vertical configuration with a decrease in at least one of rack footprint, size, mass, complexity and weight.

The present disclosure provides cooperating rack structures comprising at least two modules affixed to legs, wherein each module comprises a cylindrical composite fuel tank with a first end and a second end supporting a valve, a first sub-rack cradle disposed at the first end, a second sub-rack cradle disposed at the second end, wherein each sub-rack cradle comprises a substantially vertical first outer wall, a substantially horizontal second outer wall, an arc shaped inner wall having a top arc end and a bottom arc end, a structural body frame member affixed to the first and second outer walls and the arc shaped inner wall, a first tensioner guide adjacent to the top arc shaped end, a second tensioner guide adjacent to the bottom arc end, a catch formed in each of the tensioner guides, a top bracket mount extending from the first outer wall, a bottom bracket mount formed on the second outer wall, a front rack leg mounting plate formed perpendicular to the second outer wall, and one or more back rack leg mountings formed along the first outer wall, each module further comprising one or more tensioner assemblies, and two straps, each strap attached to each of the first and second sub-rack cradles and wrapping around the cylindrical body of the fuel tank, each strap having a first strap end and a second strap end with a strap mount guide formed in each end, wherein each strap is affixed to the sub-rack cradle via one or more of the tensioner assemblies, with the tensioner assembly having a bolt with a head, a plate, a spring, and a nut used to compress the spring against the plate, and wherein the modules are affixed to the legs in a vertically stacked orientation with connections between the legs and front rack leg mounting plate and back rack leg mounting, with each successive vertical module above the prior one being affixed via top bracket mount of the lower module to bottom bracket mount of the upper module, wherein the substantially horizontal outer wall of each successive vertical module is above and not touching the fuel tank and strap of the module immediately below.

The present disclosure provides methods of reducing the weight of vertical storage of fuel tanks for use in motor vehicles comprising affixing a cylindrical fuel tank to the arch shaped inner wall of a sub-rack cradle, and strapping the fuel tank against the sub-rack cradle whereby the fuel tank spans the gap between ends of the arch shaped inner wall and acts as a load bearing support, wherein the weight of the rack compared to a rigid frame rack holding the same cylinders is reduced.

The general description and the following detailed description are exemplary and explanatory only and are not restrictive of the disclosure, as defined in the appended claims. Other aspects of the present disclosure will be apparent to those skilled in the art in view of the detailed description of the disclosure as provided herein.

DRAWINGS

The above-mentioned features of the present disclosure will become more apparent with reference to the following description taken in conjunction with the accompanying drawings wherein like reference numerals denote like elements and in which.

As shall be appreciated by those having ordinary skill in the art, the figures are not to scale and modifications to scale within a figure or across the figures are considered within the present disclosure.

FURTHER DESCRIPTION

Unlike traditional rack and tank support system with a steel rack/cage with compartments to hold tanks. Wherein the rack is a unitary structure to which tanks are secured and the tanks form no part of the superstructure, disclosed herein are aspects of exemplary systems and methods wherein a cylindrical pressurized tank form an integral part of a superstructure for supporting one or more of such tanks in a motor vehicle.

FIGS. 1A-10 of the disclosure illustrates aspects of the disclosed exemplary implementations of cooperating tank and sub-rack elements forming a rack superstructure.

Figure 1A:
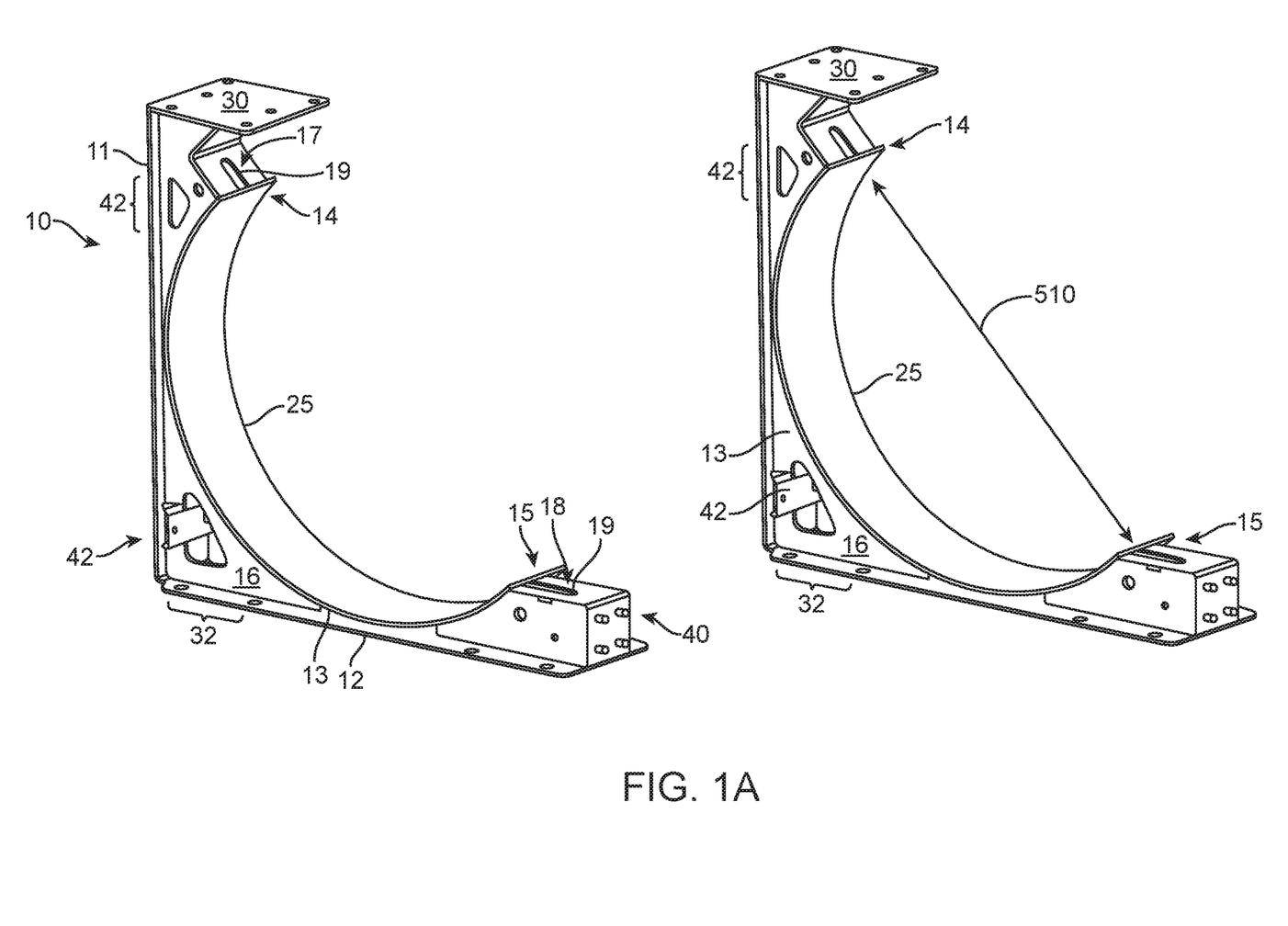
FIG. 1A shows aspects of sub-rack cradles.

A sub-rack cradle 10 forms a base element of a cooperating rack. The sub-rack cradle 10 has substantially vertical first outer wall 11 and a substantially horizontal second outer wall 12. The first and second outer walls (11/12) are perpendicular to each other. An arc shaped inner wall 13 is disposed within outer walls 11 and 12. The inner wall has a top arc end 14 and a bottom arc end 15. A structural body frame member 16 is affixed to both the outer walls and the arc shaped inner wall. It is envisioned that the inner wall, outer walls and body frame member are preferably steel. However, those of ordinary skill in the art will recognize that in some instances composite, laminate or other materials with adequate strength may be substituted without departing from the scope of the invention.

Adjacent to the top arc shaped end 14 is a first tensioner guide 17 and adjacent to the bottom arc end 15 is a second tensioner guide 18. A catch 19 is formed in each of the tensioner guides. In some implementations, a single tensioner may be used with the opposing end of the system fixed with a fastener such as a pin or a bolt.

An isolator 25 formed of a rubber-like boundary layer is attached to the arc shaped inner wall 13 to increase friction of a mounted sub-rack tank structure and to cooperate with the expansion and contraction of such a sub-rack tank.

A top bracket mount 30 extends from the first outer wall and a bottom bracket 32 mount is formed on the second outer wall. A front rack leg mounting plate 40 is formed perpendicular to the second outer wall 14. One or more back rack leg mountings 42 are formed along the first outer wall 12.

Figure 1B:
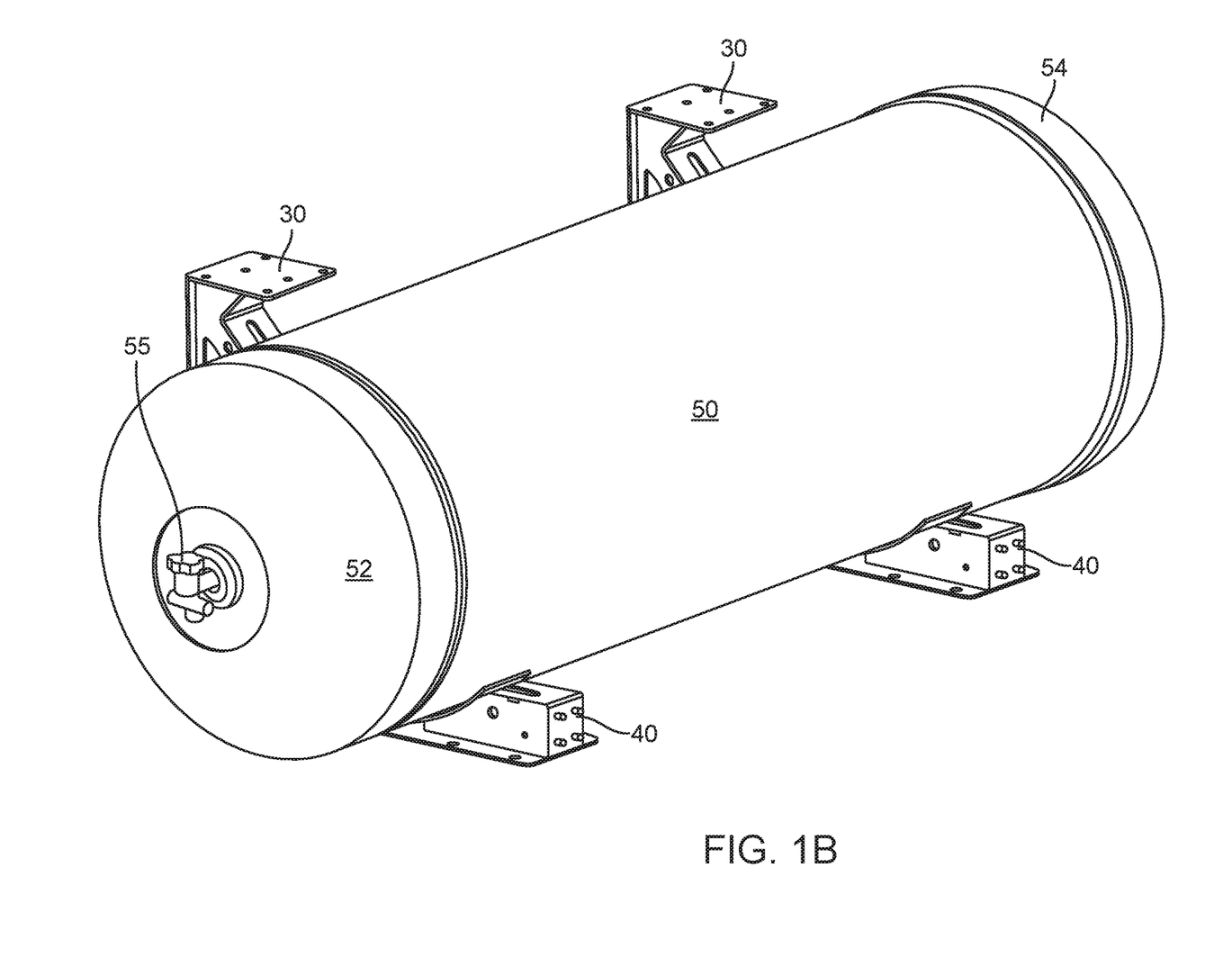
FIG. 1B shows aspects of a fuel tank which is a sub-rack member support member.
Figure 2:
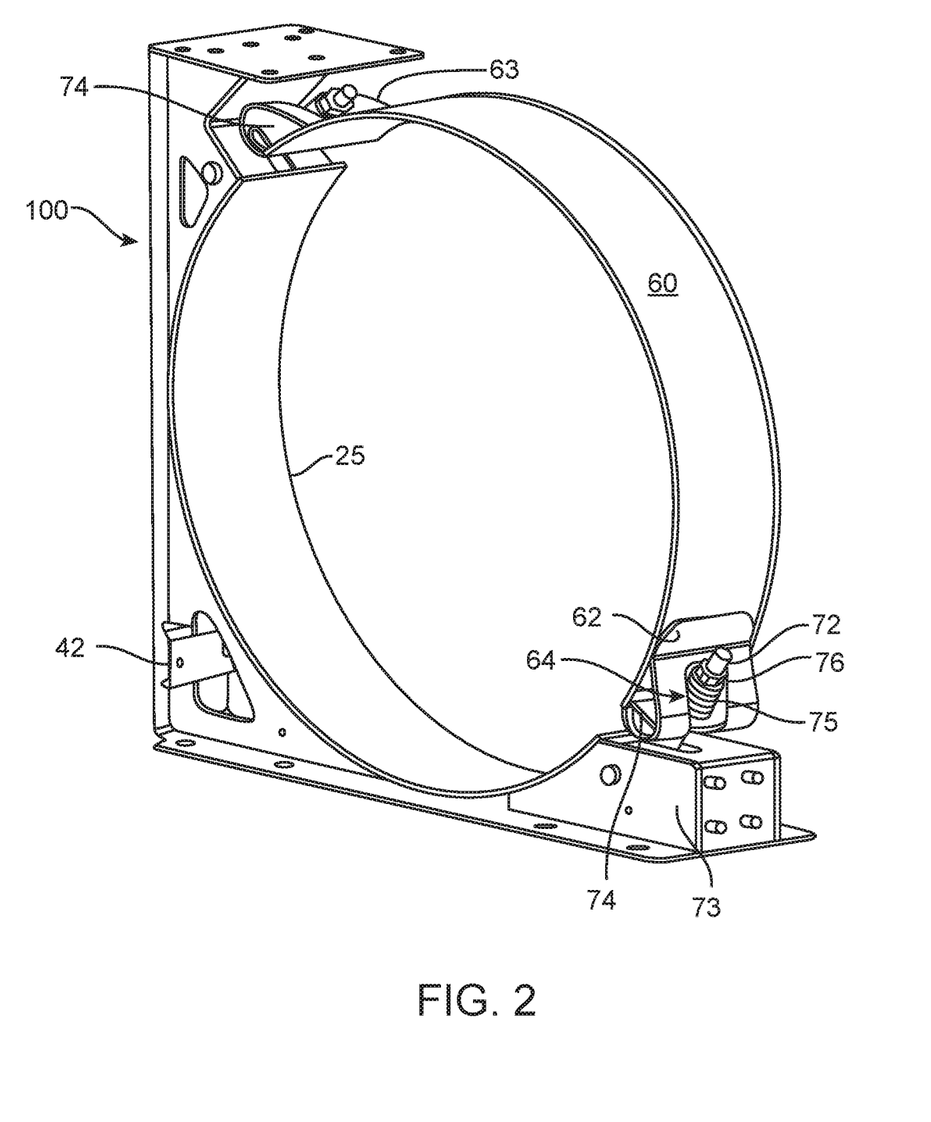
FIG. 2 shows aspects of a sub-rack strap on a sub-rack cradle.

A cylindrical composite fuel tank 50 with a first end 52 and a second end 54 supports a valve 55 at one end. A strap 60 having a first strap end 62 and a second strap end 63 with a strap mount guide 64 formed in each end is affixed to the sub-rack cradle via a tensioner assembly 70. The tensioner assembly having a bolt 72 with a head 73, a plate 74, a spring 75 and a nut 76 used to compress the spring against the plate. The strap 60 should be of a metal material and may be stainless steel, plain steel, aluminum, or other metal of sufficient strength to hold a filled fuel tank against the sub-rack cradle against a static force, applied in the six principal directions of eight times the weight of the fully pressurized container with a maximum displacement of 0.50 in. The strap 60 may have a rubber or rubber-like isolator disposed between the strap 60 and the tank.

Figure 3:
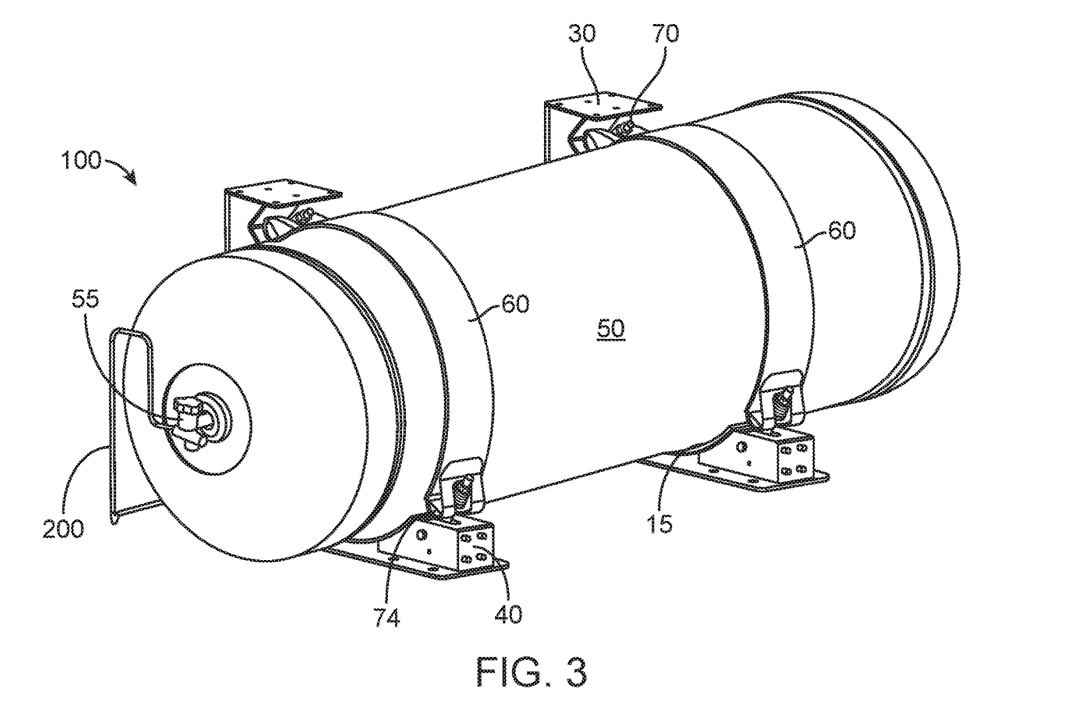
FIGS. 3 and 4 show aspects of a first sub-rack module.
Figure 4:
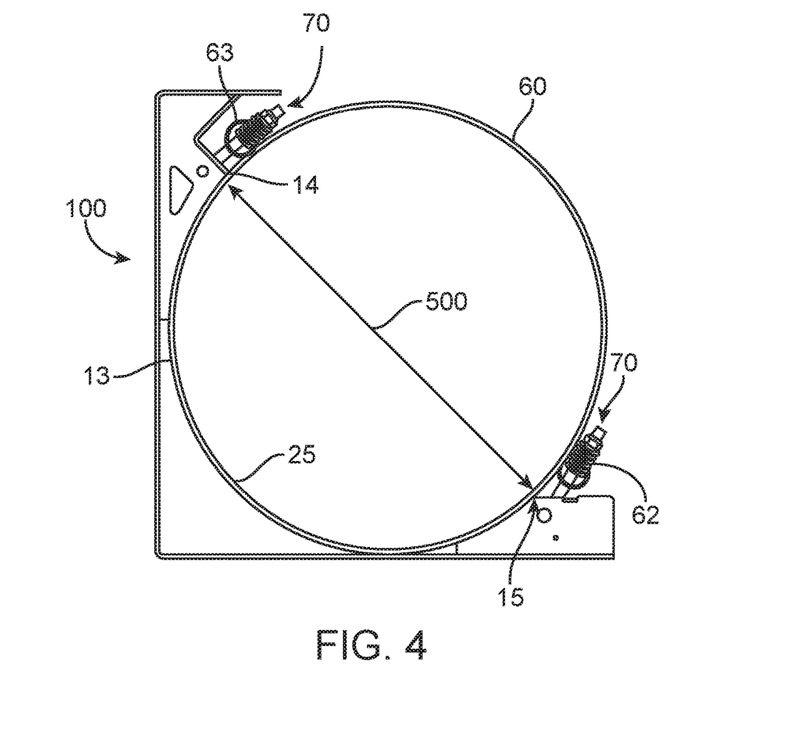

A fuel tank 50 forms a portion of a frame module 100. Each module also includes the sub-rack cradle 10, tensioners 70 and strap 60. A fuel line 200 is connected to the valve 55 for dispensing gaseous fuels.

The strength of the module 100 is provided by a combination of cradles and affixed fuel tank 50. Rather than affixed fuel tanks to a ridged frame structure which meets the NFPA 52 and/or other standards disclosed herein is a method and system of sub-rack components and structures that cooperate to form a superstructure. The fuel tank forms a sub-member of the rack module thereby reducing weight which in turn can reduce Tare weight of a truck using this system.

Force line 500 illustrated how the cylindrical fuel tank 50 when affixed to the arc shaped innerwall 13 bridges the unsupported gap 510 between the top arc end 14 and a bottom arc end 15. When the next module(s) is added vertically above the first module (FIGS. 5-11) absent the cooperating tank structure the rack structure would not have sufficient strength to hold the next level(s) above filled fuel tanks against the sub-rack cradle against a static force, applied in the six principal directions of eight times the weight of the fully pressurized container with a maximum displacement of 0.50 in.

Each fuel tank is cylindrical and preferably has a burst pressure of about 2.2 to 3 times its nominal psi rating. That burst pressure equates to a crush strength. Such cylinder can withstand hoop stress and axially stress applied externally of at least a quantity equal to the burst rating. By spanning the gap 510 between top arc end 14 and a bottom arc end 15 the tank 50 cooperates to support the structure along the force line 500.

Figure 5:
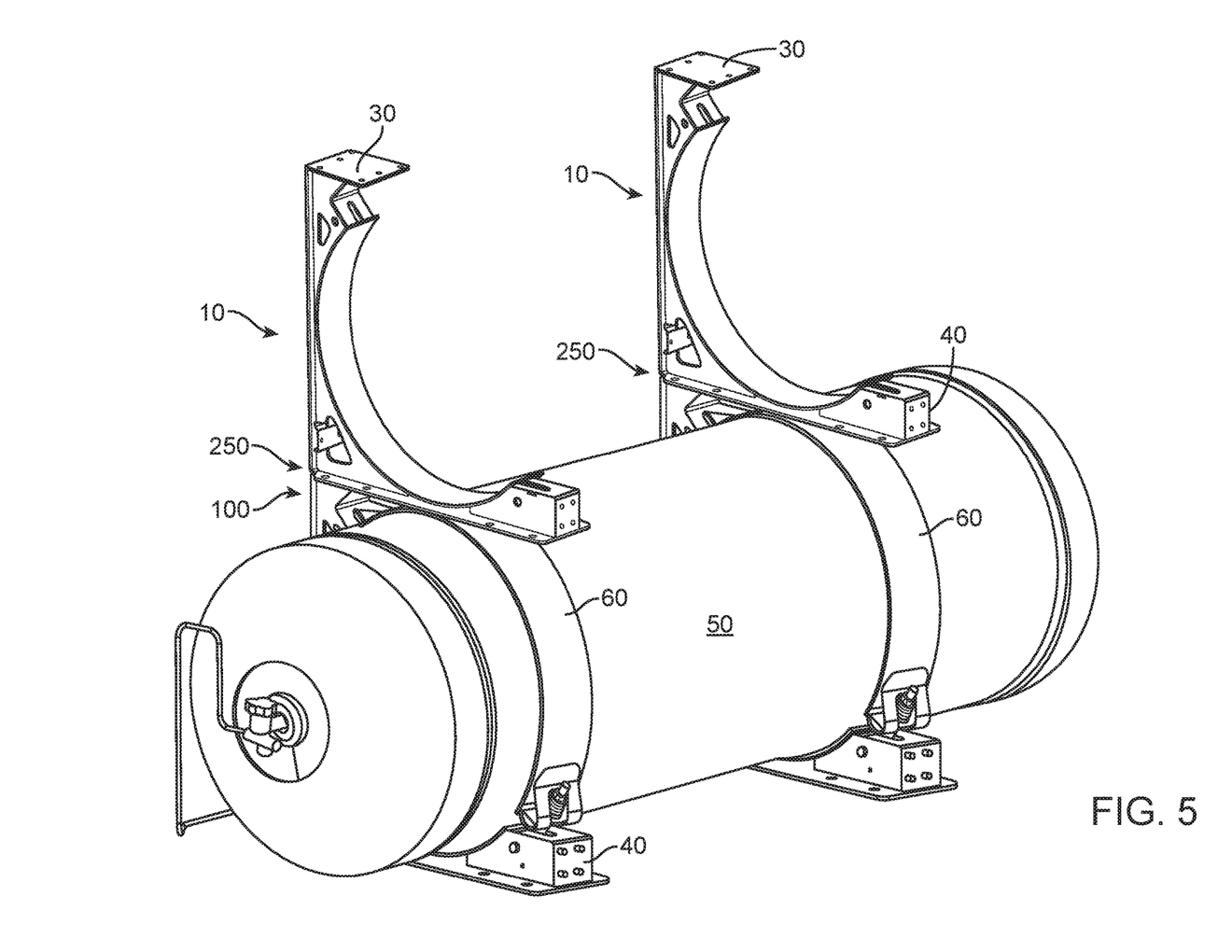
FIG. 5 shows aspects of an assembly of a rack.

Each module 100 is mounted to the next. During mounting the next vertical module above the prior one is affixed via top bracket mount 30 of the lower module to bottom bracket 32 mount of the upper module forming a connection 250. The mounting places the substantially horizontal outer wall 12 above and not touching the fuel tank 50 and strap 60 of the below module.

Figure 6:
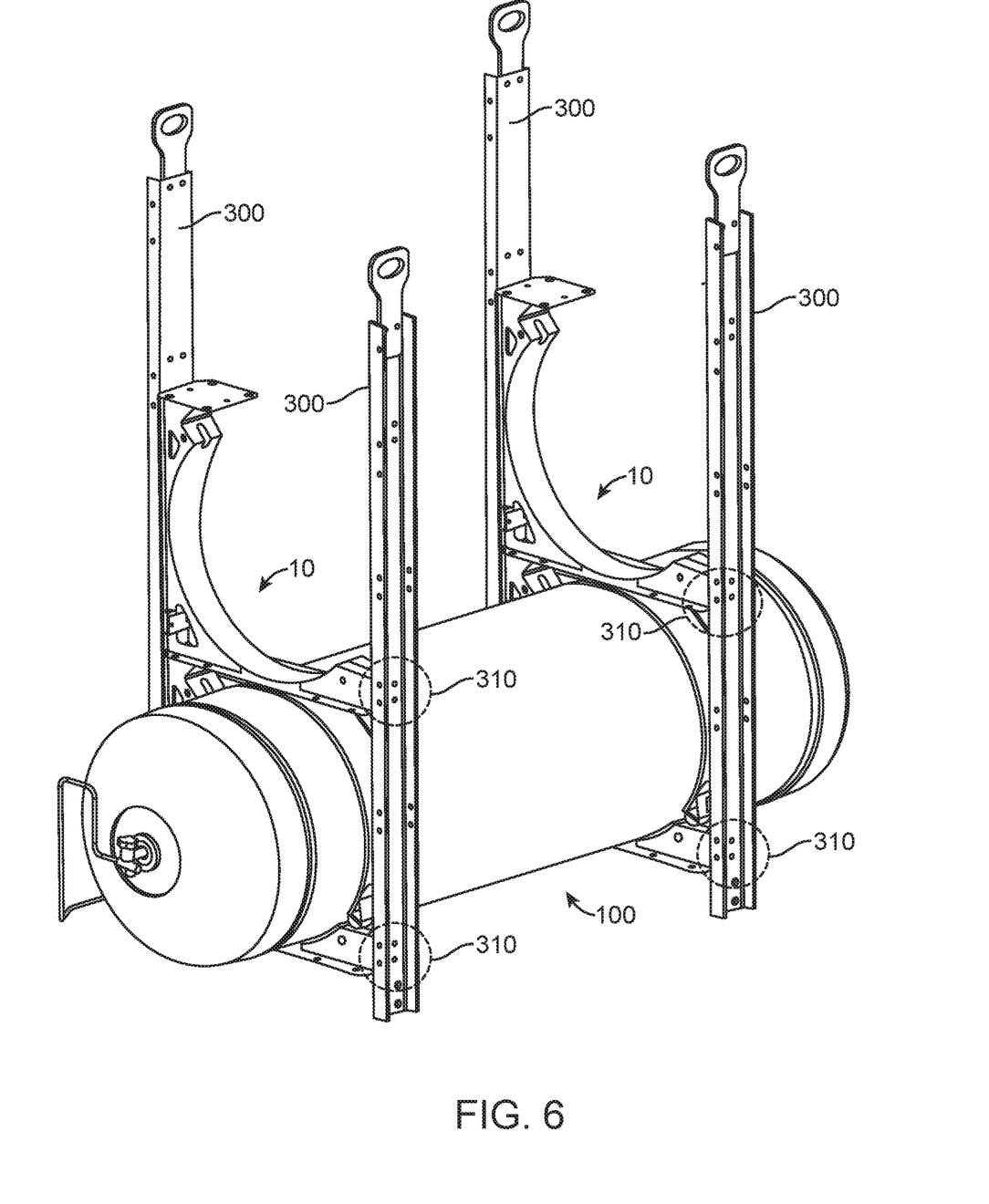
FIG. 6 shows aspects of an assembly of a rack.

FIG. 6 illustrates the addition of rack legs 300. The rack legs form upward support elements of the superstructure forming the rack. The modules are connected to the rack legs 300. The connections to the rack legs include, at a minimum front connections 310 between the front rack leg mounting plate 40 and a leg 300. Fasteners which may include bolts, pins and the like known in the art are used to connect the superstructure elements. The connections to the rack legs also include, at a minimum back connections 320 between the back rack leg mountings 42 front rack leg and a leg 300.

Figure 7:
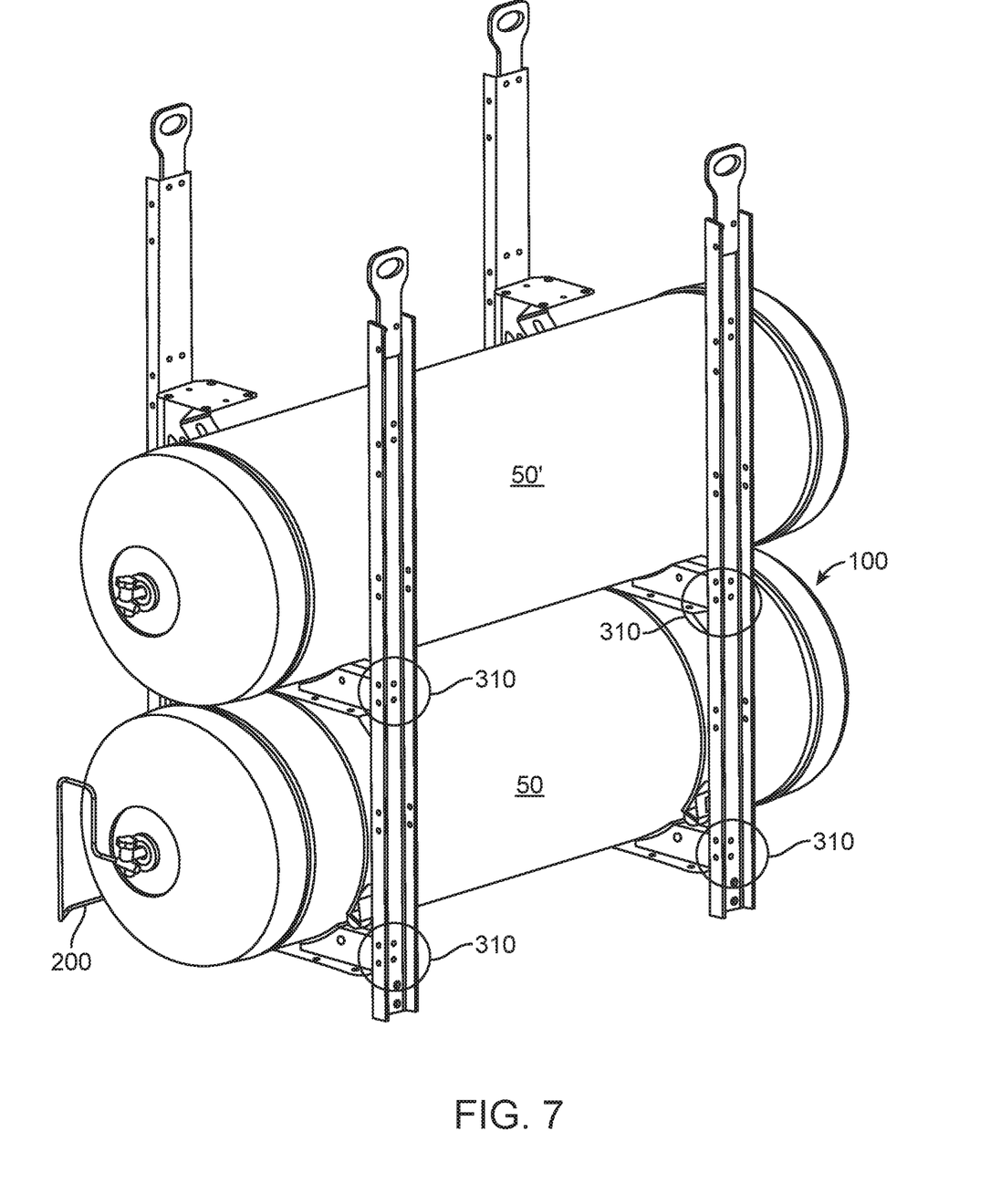
FIG. 7 shows aspects of an assembly of a rack.
Figure 8:
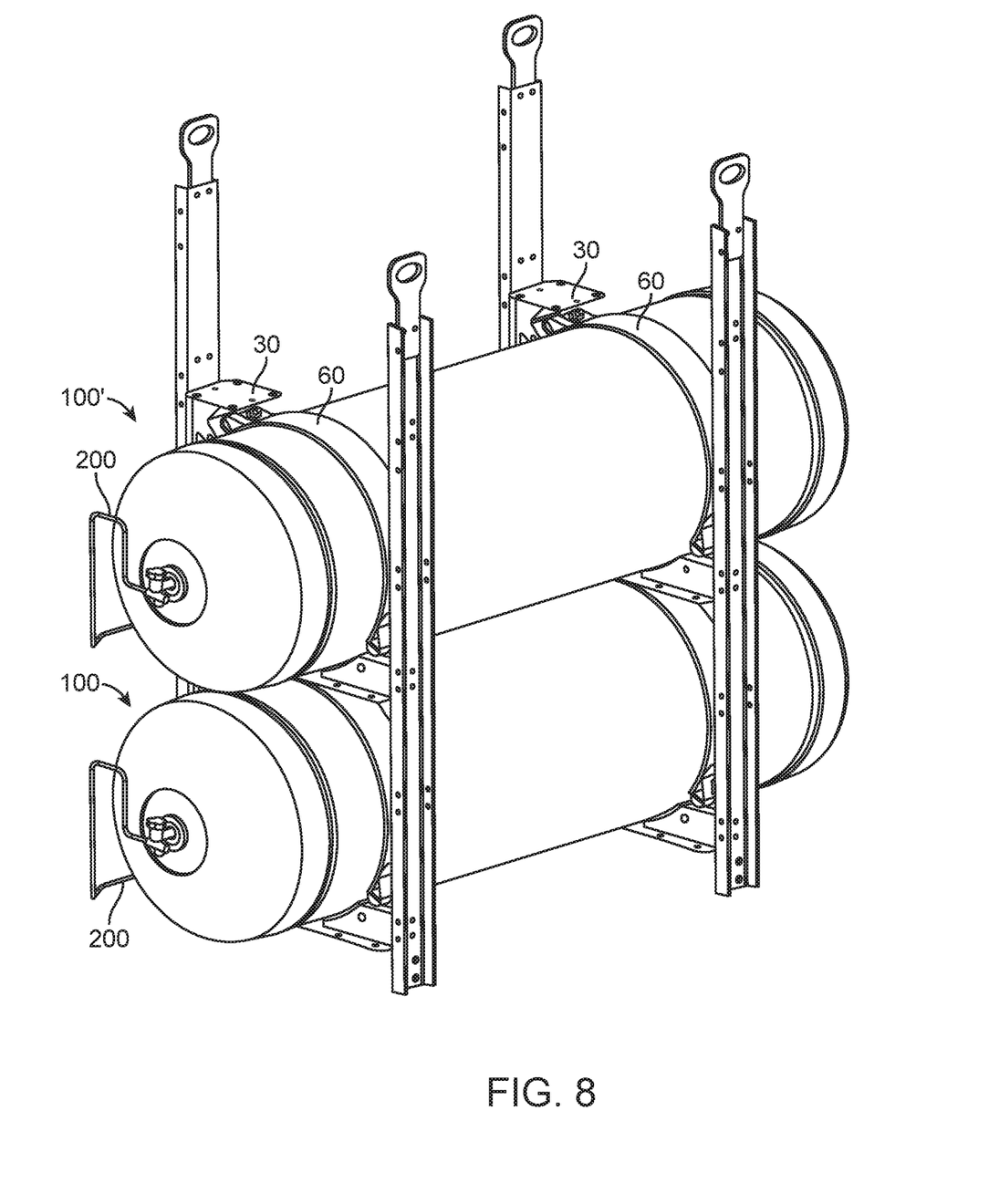
FIG. 8 shows aspects of an assembly of a rack; and,
FIGS. 9-11 show aspects of an assembled rack.

When a second fuel tank 50' is added above the first module 100 and then a strap 60 is affixed with tensioner 70, and the front and back connections (310/320) to legs 300 are completed a second module 100' extending the superstructure while adding a fuel tank is completed. The foregoing method uses the fuel tanks (50/50') as a sub-rack members or elements along with the sub-rack cradle to form the rack. Those of ordinary skill in the art will recognize that this arrangement is antithetical to a rigid superstructure rack to which fuel tanks are affixed.

Figures 9, 10:
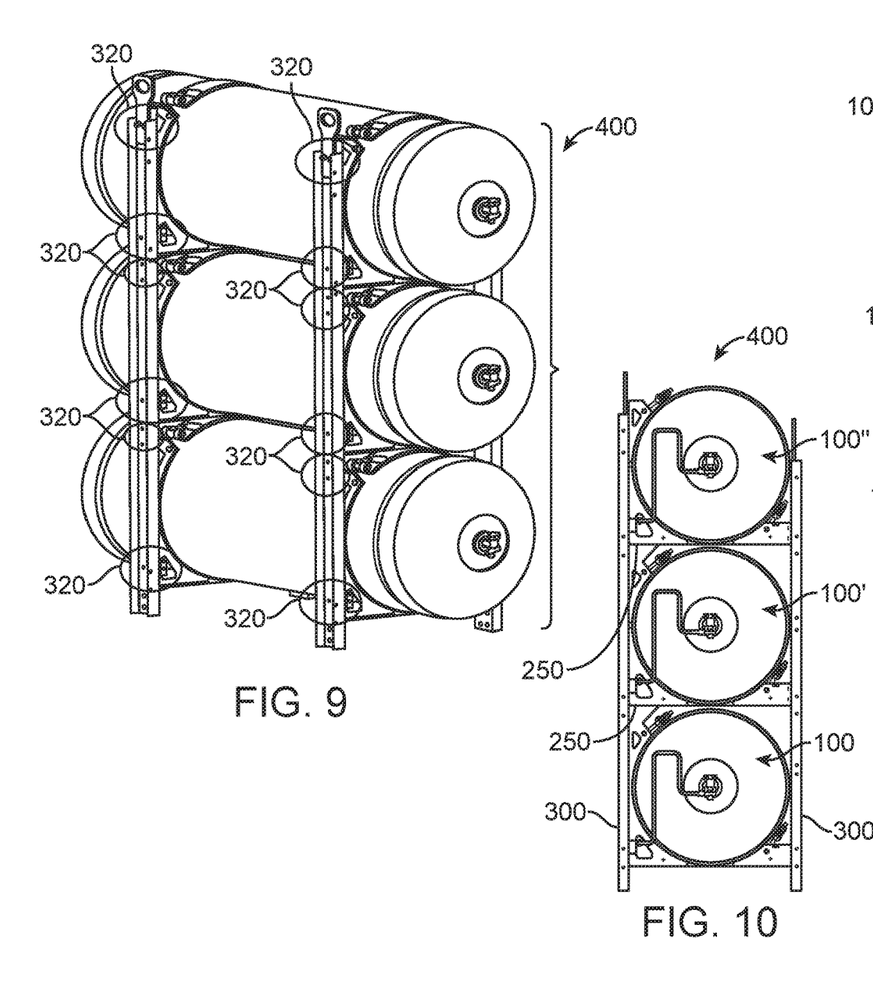
Figure 11:
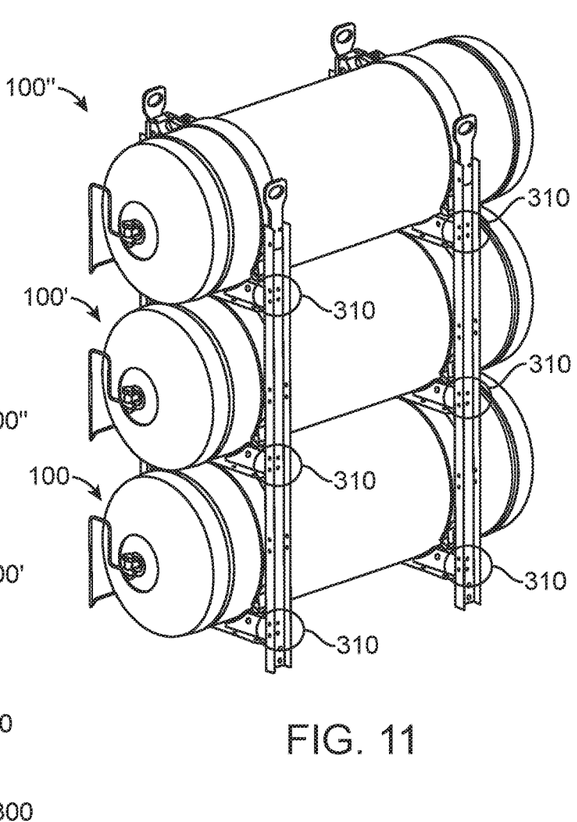

When a third fuel tank 50" is added above the second module 100' and then a strap 60 is affixed with tensioner 70, and the front and back connections (310/320) to legs 300 are completed a third module 100" extending the superstructure while adding a fuel tank is completed. If the desired fuel tank rack is for three vertical fuel tanks, then the combined three modules as shown in FIGS. 9-11 form the cooperating rack superstructure with three fuel tanks that also form support elements. The foregoing method uses the fuel tanks (50/50'/50") as a sub-rack members or elements along with the sub-rack cradle to form the rack. Those of ordinary skill in the art will recognize that this arrangement is antithetical to a rigid superstructure rack to which fuel tanks are affixed.

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A cooperating rack structure comprising at least two modules (100/100'), wherein each module (100/100') comprises:
    a cylindrical composite fuel tank (50) with a first end (52) and a second end (54) supporting a valve (55);
    a first sub-rack cradle (10) disposed at the first end;
    a second sub-rack cradle (10) disposed at the second end;
    wherein each sub-rack cradle comprises a substantially vertical first outer wall (11), a substantially horizontal second outer wall (12), an arc shaped inner wall (13) having a top arc end (14) and a bottom arc end (15), a structural body frame member (16) affixed to the first and second outer walls and the arc shaped inner wall, a first tensioner guide (17) adjacent to the top arc end (14), a second tensioner guide (18) adjacent to the bottom arc end (15), a catch (19) formed in each of the tensioner guides, a top bracket mount (30) extending from the first outer wall, a bottom bracket mount (32) formed on the second outer wall, a front rack leg mounting plate (40) formed perpendicular to the second outer wall (14), and one or more back rack leg mountings (42) formed along the first outer wall (12);
    one or more tensioner assemblies (70); and
    two straps (60), each strap attached to each of the first and second sub-rack cradles and wrapping around the cylindrical body of the fuel tank (50), each strap having a first strap end (62) and a second strap end (63) with a strap mount guide (64) formed in each end,
    wherein each strap (60) is affixed to the sub-rack cradle (10) via one or more of the tensioner assemblies (70), with the tensioner assembly (70) having a bolt (72) with a head (73), a plate (74), a spring (75) and a nut (76) used to compress the spring against the plate; and
    wherein the at least two modules are mounted together in a vertically stacked arrangement, with each successive upper module (100') above the prior lower module (100) being affixed via the top bracket mount (30) of the lower module to the bottom bracket mount (32) of the upper module forming a connection (250), and wherein the mounting places the substantially horizontal outer walls (12) of the sub-rack cradles of the upper module (100') above and not touching the fuel tank (50) and straps (60) of the lower module (100).

2. The cooperating rack structure of claim 1 wherein the modules are affixed to legs (300) with connections between the legs (300) and front rack leg mounting plate (40) and back rack leg mounting (42).

3. The cooperating rack structure of claim 1 wherein the fuel tanks (50/50'/50") in each module form a portion of the superstructure of the rack (400).

4. The cooperating rack structure of claim 1, further comprising an isolator (25) attached to the arc shaped inner wall (13) and an isolator (25) formed between a lower horizontal outer wall and a vertical outer wall and attached to each strap (60) disposed between the strap (60) and the fuel tank.

5. The cooperating rack structure of claim 4, wherein each isolator comprises rubber.

* * * * *